United States Patent [19]
Mathison

[11] Patent Number: 5,142,215
[45] Date of Patent: Aug. 25, 1992

[54] LOW IMPEDANCE REGULATOR FOR A BATTERY WITH REVERSE OVERCHARGE PROTECTION

[75] Inventor: Leslie C. Mathison, Columbia, S.C.

[73] Assignee: NCR Corporation, Dayton, Ohio

[21] Appl. No.: 629,747

[22] Filed: Dec. 17, 1990

[51] Int. Cl.[5] ............................................... H02J 1/04
[52] U.S. Cl. ........................................ 320/40; 320/31; 320/21
[58] Field of Search ..................... 361/93, 91, 92, 94, 361/95, 96, 97; 320/20, 21, 22, 23, 31, 32, 39, 40

[56] References Cited

U.S. PATENT DOCUMENTS

| | | | |
|---|---|---|---|
| 3,314,000 | 4/1967 | Rosenberg et al. | 322/25 |
| 3,867,950 | 2/1975 | Fischell | 128/419 P |
| 4,291,266 | 9/1981 | Portmann | 320/2 |
| 4,320,333 | 3/1982 | Hase | 320/43 |
| 4,487,458 | 12/1984 | Janutka | 307/577 |
| 4,488,068 | 12/1984 | Janutka | 307/570 |
| 4,531,084 | 7/1985 | Hoffman | 320/39 |
| 4,649,333 | 3/1987 | Moore | 320/31 |
| 4,710,694 | 12/1987 | Sutphin et al. | 320/21 |
| 4,731,573 | 3/1988 | Sexton et al. | 320/14 |

Primary Examiner—Steven L. Stephan
Assistant Examiner—Kristine Peckman
Attorney, Agent, or Firm—Jack R. Penrod

[57] ABSTRACT

An overcharging of a back-up battery through a protection diode of a first power regulating FET is prevented by adding a second power regulating FET that is equivalent to the first FET and the second FET has its source and drain connections reversed. By connecting and operating the second FET in a reverse direction from the first FET, the forward current direction of the protection diode of the second FET is opposite to the forward current direction of the protection diode of the first FET. Thus, the power regulator will always have one of the protection diodes reverse biased, thereby preventing reverse overcharging through the diodes. A power regulator using two such power FETs in series to prevent reverse overcharge current has a lower ON impedance than only one power FET that is in series with a blocking diode, and thereby provides more usable voltage and current for back-up situations.

16 Claims, 4 Drawing Sheets

5,142,215

LOW IMPEDANCE REGULATOR FOR A BATTERY WITH REVERSE OVERCHARGE PROTECTION

BACKGROUND OF THE INVENTION

The present invention relates to regulated voltage supplies, and more particularly to regulated voltage supplies having back-up batteries that must be protected from overcharging.

Power field effect transistors (FETs) have a high OFF impedance, a low ON impedance, and very good temperature stability. These characteristics make power FETs a near ideal regulator device for power supplies. In such regulator applications, however, the presence of reverse voltage protection diodes, which are included in most power FETs to prevent electrostatic discharge damage, must be kept in mind. The reverse voltage protection diode of primary interest in regulator designs is connected between the drain and source terminals. In an N-channel FET (N-FET), this drain-to-source diode has its anode connected to the source terminal and its cathode connected to the drain terminal. Conversely in a P-channel FET (P-FET), the drain-to-source diode has its anode connected to the drain terminal and its cathode connected to the source terminal.

FIGS. 1A and 1B show a power FET application in a power supply having a back-up battery. If Q9 is replaced with a short circuit between its drain and source connections and if its gate connection is open circuited, then FIGS. 1A and 1B would be equivalent to the power supply that is the subject of co-pending, allowed U.S. patent application Ser. No. 371,564, which is hereby incorporated by reference. The power supply shown in this allowed Application is of the magnetic amplifier type, but it could just as easily be another type of regulated power supply, such as a series and/or a shunt regulated power supply. The N-channel power FET Q10 is used as a switch and as a series regulator to supply voltage and current from a back-up battery 24 if the AC line power should fail.

Under normal circumstances a battery charger (not shown) will keep the battery charged with a controlled current and voltage to a level that is higher than the normal output voltage, thereby keeping the drain-to-source diode D10 reversed biased, which prevents current flow therethrough. A serious problem can arise, however, if the output voltage of the magnetic amplifier regulated power supply exceeds the fully charged voltage of the back-battery. This situation may occur if the output voltage regulator circuit has a component failure causing the output voltage to rise, or if the back-up battery has a short circuit in one or more of its electrolytic cells causing the level between its + and − terminals to drop. In either case, the cells of the battery may be overcharged through the drain-to-source diode. An overcharged battery cell may emit large amounts of hydrogen gas, a highly explosive gas, and may boil caustic electrolyte out of its cells, a corrosive liquid that is hazardous to personnel and electronic components alike.

One known way of preventing such a reverse overcharge is to use a series blocking diode which has its forward current flow direction opposite to the forward current flow direction of protection diode D10 to prevent any overcharging current. However, such blocking diodes typically have a forward voltage drop of 0.7 to 1.0 volts, which is a substantial drop for a 5.0 volt supply. Additionally, such blocking diodes have high forward series impedances that are many times greater than the series impedance of a FET in the ON condition. The relatively high voltage drop and the relatively high series impedance of a blocking diode substantially limit the operating power levels and operating time that the back-up battery can deliver during an AC power line failure.

Thus, it is an object of the present invention to provide a regulated power supply having a back-up battery without the hazards of overcharging one or more of the back-up battery cells.

It is another object of the present invention to provide a regulated power supply having a back-up battery that has a longer available back-up time by the use of low impedance FETs as the series regulator and/or switch.

SUMMARY OF THE INVENTION

According to one aspect of the invention, the foregoing objects are achieved by providing a power supply that has a regulated converter with feedback control for normal operation and a switch over regulating circuit with a back-up battery to supply power during a failure of the normal power line. The switch over regulating circuit uses FETs because of their low ON impedances, especially as the battery begins to decline in output voltage as stored current is supplied in place of the current normally supplied by the AC power line. Two FETs are used, each in reverse direction to the other such that the internal drain-to-source diodes within each FET will not provide a path for overcharge current should the output from the regulated converter significantly exceed the fully charged voltage of the back-up battery. Two FETs in series provide a lower impedance and a wider operating voltage range than a single FET in series with a blocking diode.

In another aspect of the invention, the aforementioned objects are achieved by providing a power supply including a device for receiving and controllably converting AC pulses into a DC output. The power supply also includes a back-up battery to provide a back-up output. A switch-over regulating circuit connects the battery to the DC output. This switch-over regulating circuit has a first FET and second FET connected in series between the battery and the DC output such that their internal drain-to-source diodes are connected in opposite current conducting directions. Further, an error amplifier is included for monitoring the DC output and providing an error signal to the receiving and converting device and to the switch-over regulating circuit. Whereby the first FET and the second FET are connected in series with their internal drain-to-source diodes in opposite current conducting directions to prevent the battery from being overcharged by current from the DC output through the diodes.

BRIEF DESCRIPTION OF THE DRAWINGS

While the specification concludes with the appended claims particularly pointing out and distinctly claiming the subject matter which is regarded as the invention, it is believed that the invention will be better understood from the following detailed description of the illustrative embodiment taken in conjunction with the accompanying drawings in which:

DETAILED DESCRIPTION OF A PREFERRED EMBODIMENT

Figure 1A:
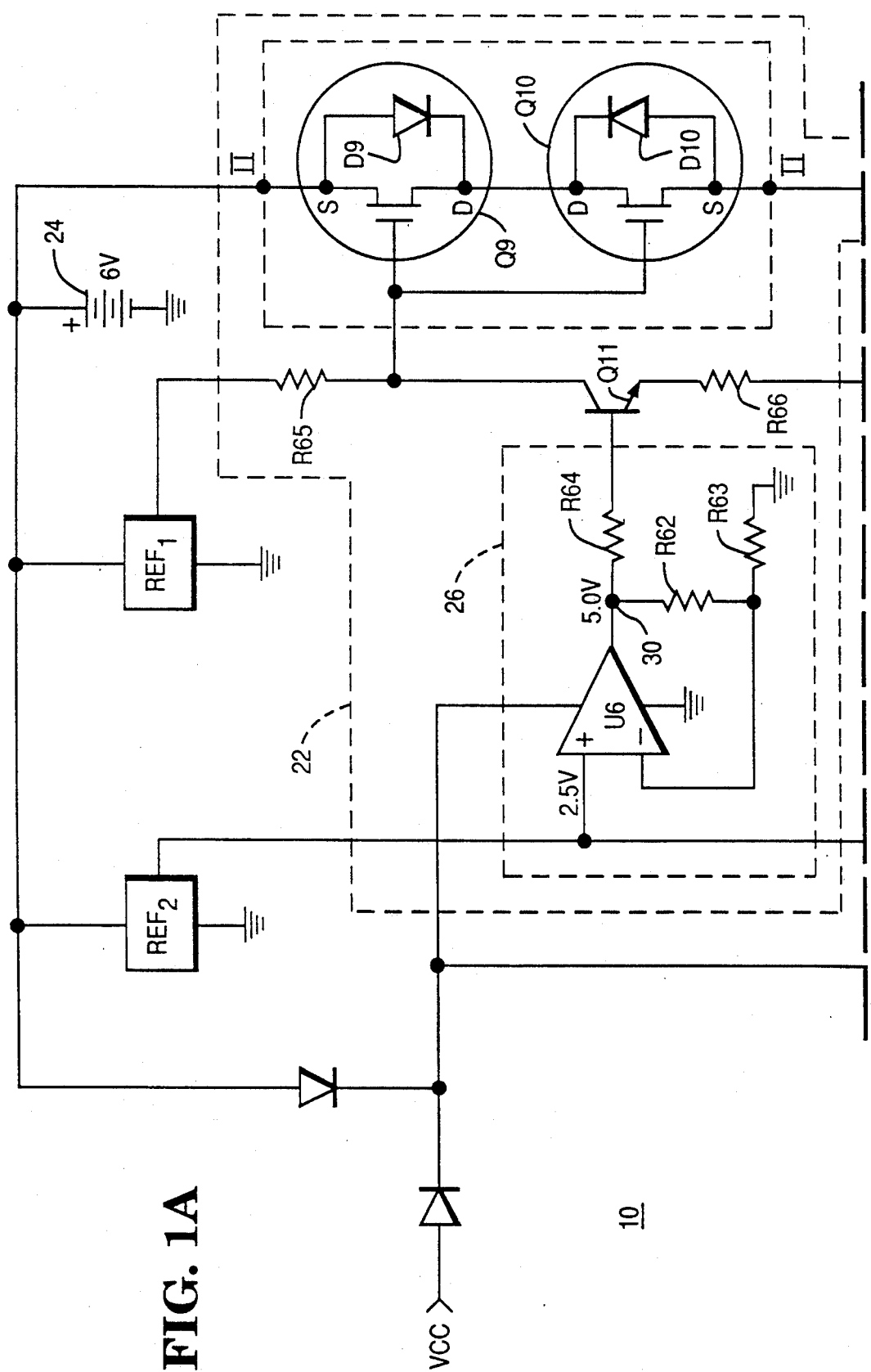
FIGS. 1A and 1B when joined form a schematic diagram of a power supply according to one aspect of the invention.
Figure 1B:
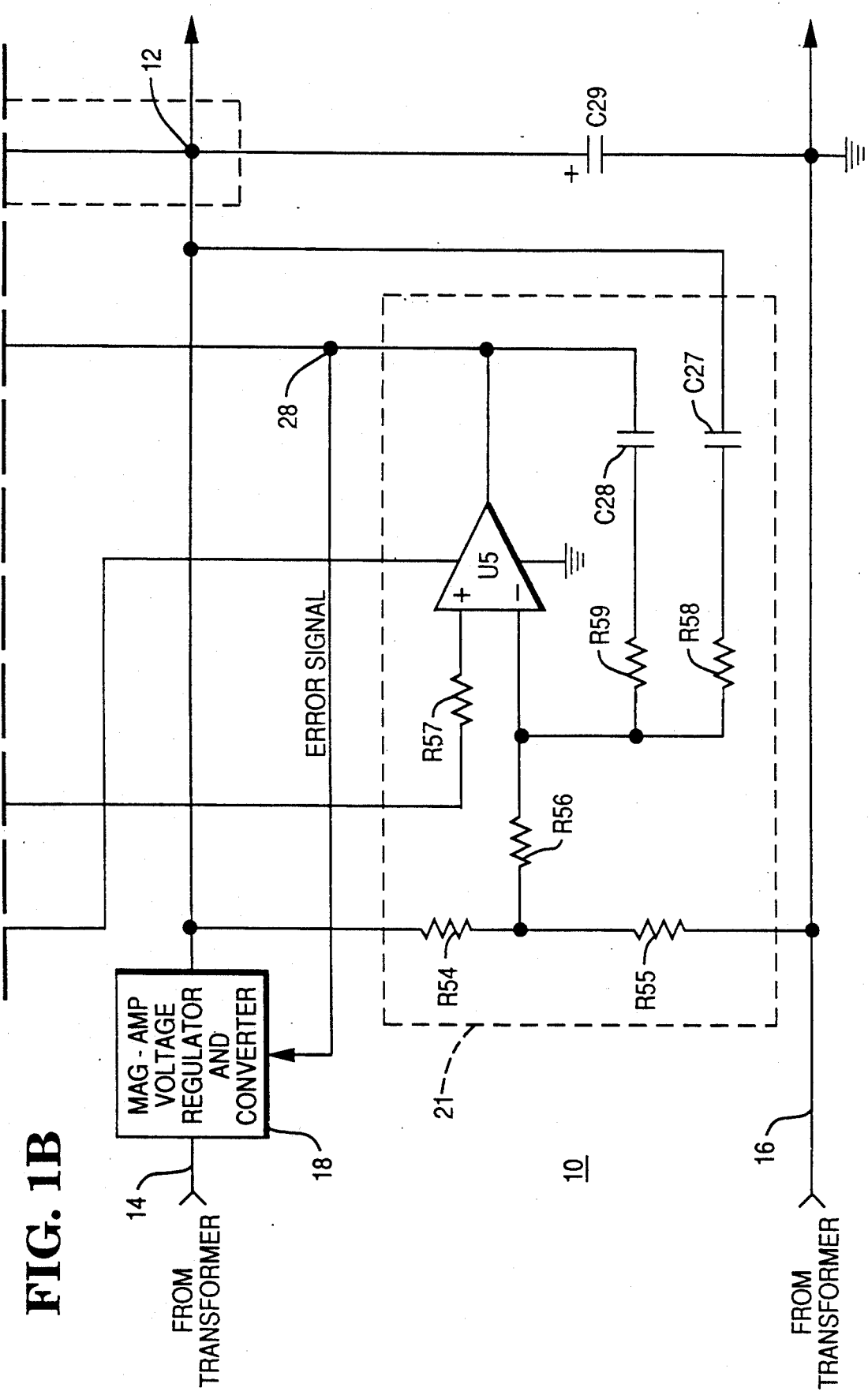

Referring now to FIGS. 1A and 1B, there is shown schematically a preferred embodiment of a power supply circuit 10 which supplies a regulated DC voltage at an output terminal 12 (FIG. 1B).

Referring now to FIG. 1B, a transformer (not shown) of a switch mode power supply that circuit 10 is a part of delivers a plurality of AC pulses to lines 14 and 16. Line 16 is a reference potential line, which in the preferred embodiment is ground. The portion of the switch mode power supply not shown in the drawings receives and converts AC line power into an unregulated supply of DC voltage stored in bulk capacitors. A switching circuit periodically pulses the DC voltage across a primary winding of the transformer to provide the plurality of AC pulses that are delivered to lines 14, 16. The switching circuit (not shown) is either ON or OFF, which causes AC pulses delivered to be rectangular in shape. Such a switching mode power supply is described in U.S. Pat. No. 4,928,218, which is hereby incorporated by reference.

Referring now to FIG. 1B, power supply 10 includes a magnetic amplifier circuit 18 which regulates the pulse width of AC voltage and AC current pulses received by the power supply circuit 10 by varying the operating point of a saturable reactor (not shown). The regulated AC voltage and AC current pulses are subsequently converted and inductively filtered to provide a DC voltage and a DC current that are delivered to capacitor C29 connected between output terminal 12 and reference potential line 16. Further details of the magnetic amplifier 18 are presented in the aforementioned co-pending U.S. patent application Ser. No. 371,564. Those skilled in the art will appreciate that there are other regulating and converting devices that may be used instead of the magnetic amplifier circuit 18, such as a regulator which uses power transistors to switchably regulate the pulse width of the received power instead of a saturable reactor. Thus, the magnetic amplifier 18 is presented as an example and it is not meant to be limiting to the scope of the specification or claims.

The power supply 10 also includes an error amplifier 21. The error amplifier 21 has a differential amplifier U5, such as a type LM 324 manufactured by Texas Instruments, Dallas, Tex., that has inverting (−) and non-inverting (+) inputs and an output 28. The non-inverting (+) input of U5 is connected to a reference potential REF$_2$ through a resistor R57. The inverting input (−) of U5 is connected through a resistor R56 to a mid point of a voltage divider formed by series resistor R54 and R55. The voltage divider R54, R55 is connected between the output terminal 12 and the reference potential 16. Thus, the inverting (−) input of U5 receives a voltage that is proportional to the DC output voltage.

In operation with AC line power active, magnetic amplifier 18 regulates and converts the AC pulses it receives and provides a DC output voltage at terminal 12. In a preferred embodiment this output voltage is nominally 5.1 volts. The error amplifier 21 uses its voltage divider R54, R55 to sense the output voltage at terminal 12. The differential amplifier U5 amplifies the difference between REF$_2$ and the output voltage divided by R54 and R55 as an error signal. This error signal is fed back to magnetic amplifier 21 as a control signal which is used to regulate the pulse width of the AC voltage and AC current pulses delivered to and converted by the magnetic amplifier 21. In a preferred embodiment REF$_2$ is approximately 2.5 volts and the DC output voltage at terminal 12 is meant to be 5.1 volts.

Referring again to FIG. 1A, the power supply 10 further includes a switch-over regulator circuit 22 for connecting a back-up battery 24 to output terminal 12. Switchover regulating circuit 22 includes transistors Q9, Q10, and Q11, resistors R64, R65, and R66, and a precision voltage reference voltage supply circuit 26. In a preferred embodiment, the positive (+) terminal of back-up battery 24 is connected to the source of Q9, which is an N-FET such as type BUZ11 manufactured by Motorola Incorporated, and the negative (−) terminal of the battery 24 is connected to the reference potential 16 (i.e. ground). The drain of N-FET Q9 is connected in series to the drain of a similar N-FET Q10, and the source of N-FET Q10 is connected to terminal 12 thereby connecting back-up battery 24 to the DC output. The gates of Q9 and Q10 are connected together such that Q9 and Q10 act as a single device. It is worth noting that Q9 is being operated in reverse, as will be explained below.

Figure 2A:
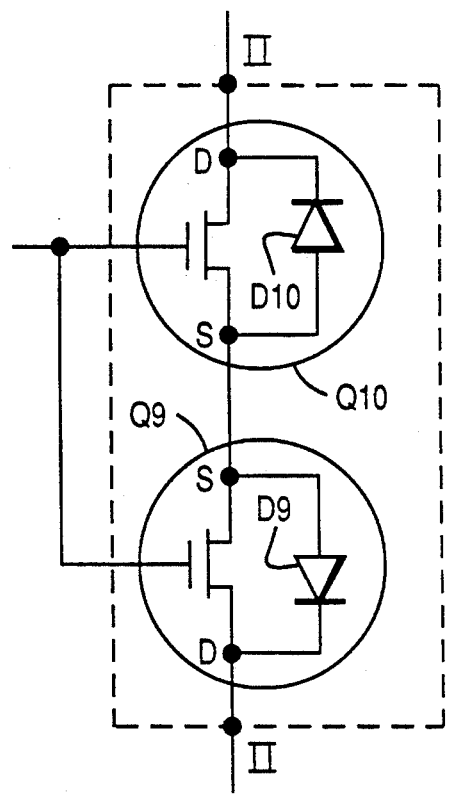
FIG. 2A shows a different series combination of N-FETs for the switch over subsection II—II shown in FIG. 1A.

N-FETs Q9 and Q10 have internal protection diodes D9 and D10 respectively. Typically, such diodes are formed on the substrate with the power FET. For an N-FET the anode of the protection diode is connected to the source terminal and the cathode is connected to the drain electrode. Under normal circumstances, the drain electrode of an N-FET is at a higher voltage potential than the source electrode which keeps the protection diode reverse biased and cut off. Under some abnormal circumstances, such as a short circuit in one of the cells of back-up battery 24 or a failure in the magnetic amplifier 18 and/or the error amplifier 21, the output voltage between terminal 12 and the reference potential 16 may become greater than the voltage between the positive (+) terminal of the battery 24 and the reference potential 16. For such abnormal circumstances, diode D10 would become forward biased and an overcharging current would flow into the back-up battery 24, if Q9 were not there and the positive (+) terminal of battery 24 were connected to the drain of Q10. An overcharge could cause a build-up of hydrogen gas which may explode, or it could cause a boil over of corrosive electrolyte from the battery cells thereby damaging nearby circuits and presenting a hazard to operating personnel. Thus, Q9 was inserted in series with Q10 in a reverse direction so that its protection diode D9 would be reverse biased and cut off during those abnormal circumstance when the output voltage at terminal 12 exceeds the voltage of the battery 24 thereby preventing a battery overcharge condition. This means that Q9 when connecting back-up power is operated in reverse, i.e. current flowing in the channel is in a reverse direction, but such operation is possible as long the reverse characteristics for the device are observed. Since Q9 and Q10 are in series, they could alternatively be connected source-to-source within the subcircuit II—II, as shown in FIG. 2A, and still retain the same over charge current blocking capability.

Figure 2B:
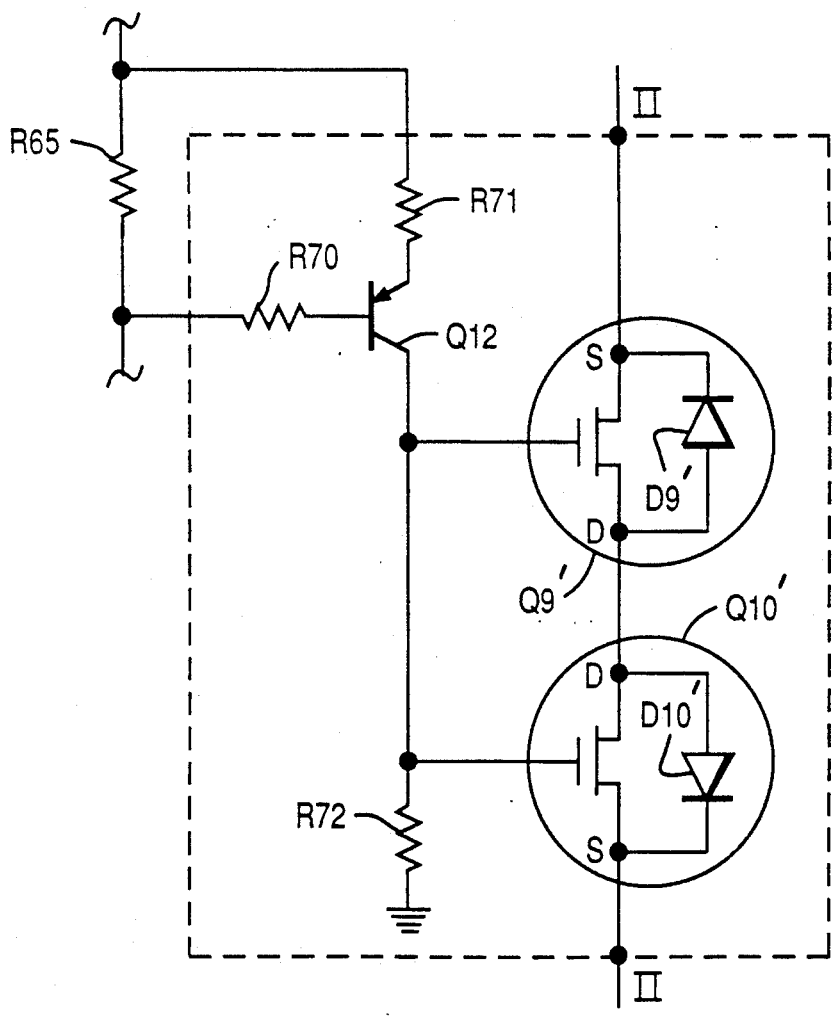
FIG. 2B shows a series combination of P-FETs for the switch over subsection II—II shown in FIG. 1A.
Figure 2C:
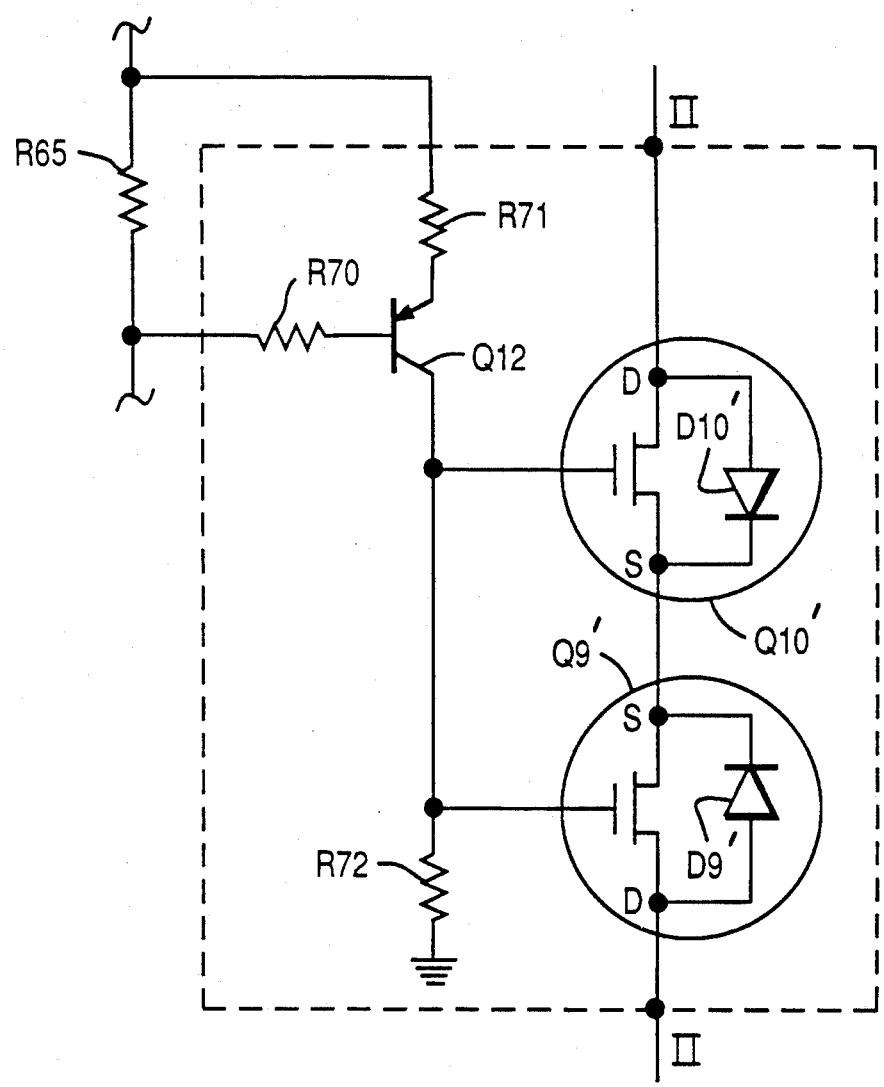
FIG. 2C shows another series combination of P-FETs for the switch over subsection II—II shown in FIG. 1A.

Referring to FIGS. 2B and 2C, alternative embodiments of the power supply 10 are shown with series power FETs Q9' and Q10' as P-FETs. The series connections are analogous to that of the N-FETs Q9 and Q10, except that the protection diodes D9' and D10' have their anodes connected to their respective drain electrodes and their cathodes connected to their respective source electrodes. But, the change of the channel polarity means that Q10' will be the FET which is operated in reverse. Some changes to the driving circuits may be necessary within the subcircuits II—II shown in FIGS. 2B and 2C in order to accommodate the requirements of the P-FETs Q9' and Q10'. Such changes might include adjusting the values of R65 and R66, or adding an additional drive stage connected across R65. The additional drive stage has an additional transistor Q12 connected to the collector of Q11 through a resistor R70. The emitter of the transistor Q12 is connected through a resistor R71 to the common point of REF$_1$ and R65. The collector of the transistor Q12 is connected to the gates of Q9' and Q10', and also to one end of resistor R72. The other end of resistor R72 is connected to ground. Connected thus, Q12 provides the proper drive voltages to drive the switch over regulator P-FETs Q9' and Q10'. This drive circuit is only one of many possible drive circuits and is given by way of example, and should not be construed as a limitation.

Referring now to FIG. 1A, transistor Q11 is connected between the gates of Q9, Q10 and the output 28 of error amplifier 21. In a preferred embodiment, resistor R66 is connected between the emitter of transistor Q11 and output 28. The gates of Q9 and Q10 are connected through resistor R65 to reference voltage REF$_1$. The control electrode or base of transistor Q11 is connected to a reference potential terminal 30 through resistor R64. In a preferred embodiment, the reference potential for the base of Q11 is provided by precision reference voltage supply circuit 26. Circuit 26 has a differential amplifier U6, such as type LM 324 mentioned previously, with non-inverting (+) and inverting (−) input terminals and an output terminal connected to terminal 30. Resistors R62 and R63 form a voltage divider of the voltage between terminal 30 and reference potential line 16. The common point of resistors R62 and R63 provides a feed back signal to the inverting (−) input of differential amplifier U6. A reference potential REF$_2$ is connected to the non-inverting (+) input of differential amplifier U6. The output of differential amplifier U6 is connected to the base of Q11 through resistor R64. In this manner, the base-emitter junction of Q11 will be forward biased and active if the output voltage of the precision reference voltage supply circuit 26 at terminal 30 is at least one base-emitter voltage drop greater than the output voltage of the error amplifier at terminal 28, otherwise the base-emitter junction will be reverse biased and Q11 will be cut off.

In operation, the error amplifier 21 is connected to both the magnetic amplifier regulator and converter circuit 18 and the switch over regulating circuit 22. As mentioned before, the error signal controls the pulse width of the voltage and current pulses delivered to the magnetic amplifier regulator and converter circuit 18 and thereby regulates the voltage at output terminal 12. For example, if the output voltage starts to decrease below its nominal voltage, the error signal will increase because the output voltage is fed back to the inverting (−) input of differential amplifier U5 by the voltage divider R54, R55. This causes the magnetic amplifier to change its biasing of its saturable reactor to increase the pulse width of the received voltage and current pulses, which causes an increase of the output voltage to terminal 12.

The error signal from differential amplifier U5 is also provided to switch-over regulating circuit 22. Specifically, the error signal is provided through R66 to the emitter of Q11. In a preferred embodiment, REF$_1$ is approximately 14 volts, REF$_2$ is approximately 2.5 volts, and voltage divider resistors R62, R63 are equal, which causes the voltage to the base of Q11 to be approximately 5 volts. As long the emitter of Q11 is below approximately 4.5 volts, Q11 will be turned ON and the collector voltage (i.e. voltage on the gates of Q9 and Q10) will be pulled low enough to keep N-FETs Q9 and Q10 OFF. If the output voltage at terminal 12 increases above its nominal value, because of a component failure in the magnetic amplifier regulator and converter 18 or upstream therefrom, the error signal at U5 output will decrease and pull Q11 even lower, thereby assuring that Q9 and Q10 are kept OFF. Further, the diode D9 will prevent an overcharge of the back-up battery 24 by the abnormally high output voltage.

As the output voltage at terminal 12 decreases, magnetic amplifier regulator and converter 18 will attempt to bring it up by increasing its pulse width, as described previously. However, if the power supply has lost AC line power, the output voltage will continue to decrease. This will increase the error signal at terminal 28, thereby raising the emitter voltage on transistor Q11 and decreasing the emitter-to-collector conductance thereof. This will cause an increase in the collector voltage of Q11 (which means the voltage on the gates of Q9 and Q10 also increases) which will turn N-FET Q9 ON in the reverse direction and Q10 ON in the normal direction. A FET driven in the reverse direction has electrical characteristics that are very similar to its electrical characteristics when driven in the normal direction, except that the normal source will act like a "drain" and the normal drain will act like a "source". Thus, in an AC line failure or similar failure condition, the back-up battery 24 will be connected through Q9 and Q10 to output terminal 12 to provide the required voltage. The error amplifier 21 will continue to monitor and regulate the output voltage by varying the conductance of Q11 and thereby the conductance of N-FETs Q9 and Q10. By sizing and selecting the components of the switch over regulating circuit 22 and the error amplifier circuit 21, N-FETs Q9 and Q10 can regulate the output voltage at terminal 12 as the voltage of the back-up battery 24 declines because of discharging. As the voltage of back-up battery 24 approaches 5 volts, Q9 and Q10 may be driven by Q11 to an operating point where the impedance across them is very low. This allows the back-up battery 24 to provide more usable voltage and current than if Q10 alone were used in series with a blocking diode to prevent any possible overcharges, because of the typically voltage losses of 0.7 to 1.0 volts and the relatively high series impedances of such diodes.

Thus, it will now be understood that there has been disclosed a low impedance regulator for a back-up battery which has protection from reverse overcharging. While the invention has been particularly illustrated and described with reference to a preferred embodiment thereof, it will be understood by those skilled in the art that various changes in form, details, and applications may be made therein. It is accordingly intended that the appended claims shall cover all such changes in form, details and applications which do not depart from the true spirit and scope of the invention.

What is claimed as new and desired to be secured by Letters Patent of the United States is:

1. A power supply comprising:
   means for receiving a plurality of AC pulses and controllably converting said pulses to a DC output;
   a back-up battery;
   a switch-over regulating circuit connecting said battery to said DC output, said switch-over regulating circuit having a first FET and a second FET connected in series between said battery and said DC output such that their internal drain-to-source diodes are connected in opposite current conducting directions; and
   an error amplifier for monitoring said DC output and providing, at its output, an error signal to said receiving and converting means and said switch-over regulating circuit;
   whereby said first FET and said second FET are connected in series with their internal drain-to-source diodes in opposite current conducting directions to prevent said battery from being overcharged by current from said DC output through said diodes.

2. The power supply of claim 1 wherein said first and second FETs are N-channel FETs.

3. The power supply of claim 2 wherein said first and second FETs are connected in series drain-to-drain.

4. The power supply of claim 2 wherein said first and second FETs are connected in series source-to-source.

5. The power supply of claim 2 wherein said first and second FETs have their gates connected together.

6. The power supply of claim 2 wherein said first and second FETs have their gates connected together through an impedance.

7. The power supply of claim 1 wherein said receiving and converting means is a magnetic amplifier circuit including a saturable reactor for receiving and controlling said AC pulses and a rectifier for converting said AC pulses into a pulsating DC output.

8. The power supply of claim 7 wherein said pulsating DC output is filtered into a smooth DC output by a filter.

9. The power supply of claim 7 wherein said error amplifier output is connected to a control input of said magnetic amplifier circuit to control a pulse width of said AC pulses to affect a voltage level of said DC output.

10. The power supply of claim 1 wherein said switch-over regulating circuit has a driver circuit having a driver transistor and said first and second FETs are P-channel FETs.

11. The power supply of claim 10 wherein said first and second FETs are connected in series drain-to-drain.

12. The power supply of claim 10 wherein said first and second FETs are connected in series source-to-source.

13. The power supply of claim 10 wherein said first and second FETs have their gates connected together.

14. The power supply of claim 10 wherein said first and second FETs have their gates connected together through an impedance.

15. A power supply comprising:
   means for receiving a plurality of AC pulses and controllably converting said pulses to a pulsating DC output;
   a filter for filtering said pulsating DC output to a smooth DC output;
   a back-up battery;
   a switch-over regulating circuit connecting said battery to said DC output;
   an error amplifier for monitoring said DC output and providing, at its output, an error signal to said receiving and converting means and said switch-over regulating circuit;
   wherein said switch-over regulating circuit includes first and second FETs connected in series drain-to-drain for connecting said battery to said DC output and regulating the voltage of that output, and a bipolar transistor connected between the control electrodes of said first and second FETs and said output of said error amplifier, said control electrode of said first and second FETs being connected to a first reference potential terminal, and the control electrode of said bipolar transistor being connected to a second reference potential terminal.

16. The power supply of claim 15 wherein said receiving and converting means is a magnetic amplifier that includes a saturable reactor for receiving and controlling said AC pulses.

* * * * *